Patented June 4, 1940

2,202,893

UNITED STATES PATENT OFFICE 2,202,893

PROCESS FOR TREATING SLIMES

Jesse O. Betterton and Yurii E. Lebedeff, Metuchen, and Donald P. Wilkes, Perth Amboy, N. J., assignors to American Smelting and Refining Company, New York, N. Y., a corporation of New Jersey Application April 29, 1939, Serial No. 270,748

14 Claims. (Cl. 75—99)

This invention relates to the treatment of slimes, which term, as used herein, is defined as the finely-divided materials comprising selenium, precious metals and other values which result from the electrolytic copper refining process and which are various referred to as anode muds, slimes, sludges, etc.

Among other features and advantages, the present invention provides an improved process for treating slimes which permits an efficient separation of the values to be accomplished at sufficiently low temperatures that ordinary iron refinery kettles may be employed in the operation.

Generally speaking, the invention embraces removing copper from the slimes and converting the selenium content of the copper-depleted slimes to reduced soluble form over a metal bath comprising lead under such conditions that there is produced a fluid two-layer charge, the bottom layer of which contains the precious metals and lead contents of the slimes while the upper layer contains the selenium. The two layers are then separated and processed separately for recovery of their respective values.

More specifically, the invention contemplates fusing decopperized slimes over a lead bath with caustic alkali and coke or other suitable reducing agent, with or without the addition of steam and preferably in the presence of sulphur in available sulphide form, to yield the thoroughly liquid two-layer slag referred to above. By reason of the fluidity of the slag, the metallic lead and precious metal fall freely therefrom into the layer of molten lead below while at the same time the selenium and tellurium are converted to, and retained in the slag as, reduced alkali compounds which are readily amenable for subsequent treatment and recovery.

The invention further consists in the new and novel features of operation and the new and original combinations of steps in the process hereinafter described and more particularly set forth in the claims.

Figure 1:
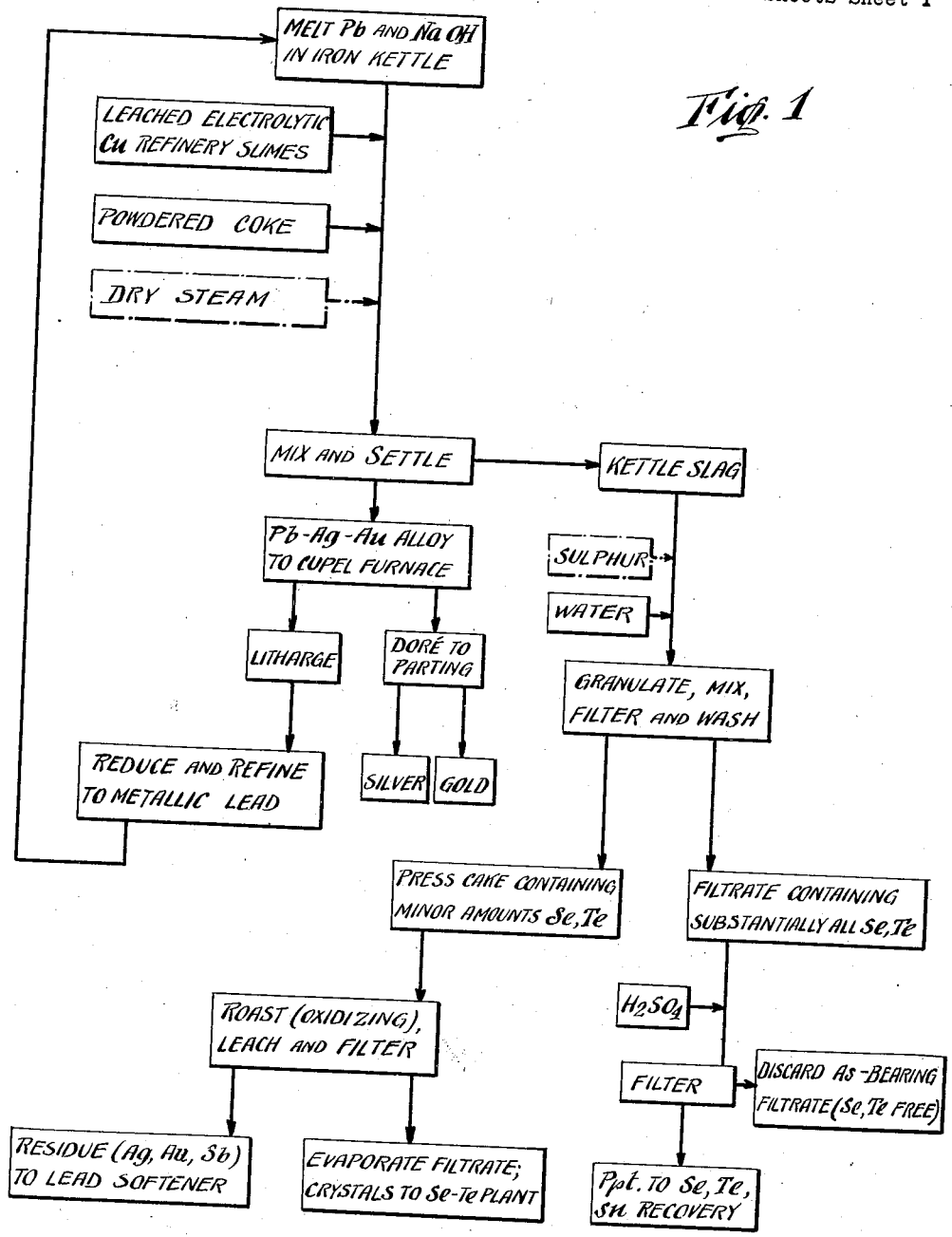
Figure 2:
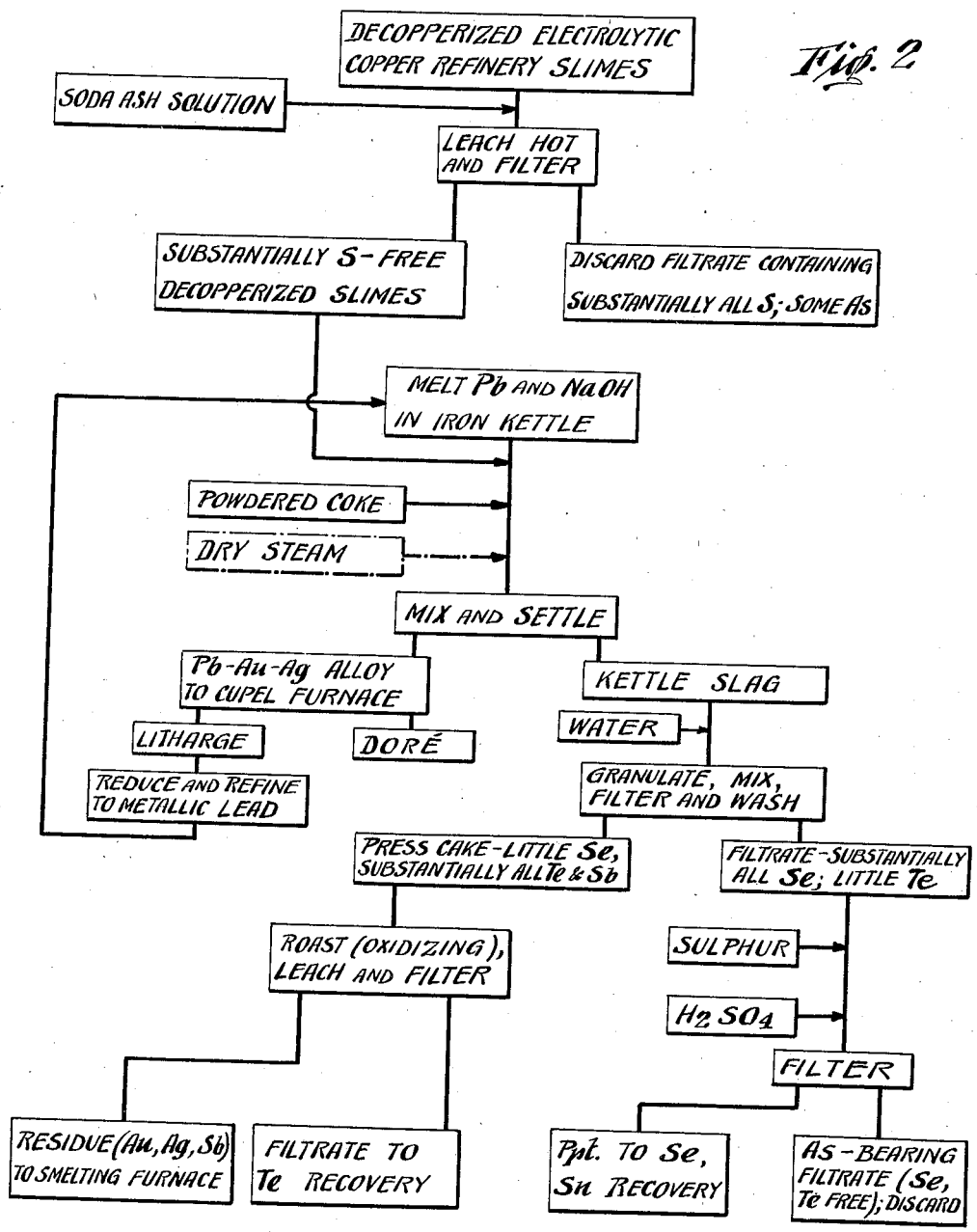

The invention may be better understood by reference to the drawings accompanying and forming a part of this specification in which Fig. 1 is a flow sheet of the process of the invention in its preferred form, and Fig. 2 is a flow sheet of a modified form of the process of the invention and may be considered as alternative to that shown in Fig. 1.

In connection with the present process it should be borne in mind that the slimes contain, normally, as they come from the electrolytic tanks, various constituents other than precious metals and selenium. For example, typical slimes contain considerable lead and smaller amounts of other elements such as antimony, arsenic, tin, tellurium, etc. and copper.

Now, proceeding in accordance with the invention and with particular reference to Fig. 1, the slimes are first treated for the removal of copper. This may be done in several manners, as by roasting and then leaching with sulphuric acid solution, or by direct leaching with copper refining electrolyte in accordance with United States Letters Patent No. 2,031,299 granted February 18, 1936 to Jesse O. Betterton and George H. Weis.

The leached slimes are then fused with caustic soda and coke over a lead bath to form the two-layer charge previously mentioned. This operation may be conducted as follows: lead, which may be appropriately common, refined or antimonial, and caustic are melted in an ordinary cast iron refinery kettle provided with the usual mechanical mixer. The slimes are mixed with coke and the resulting mixture gradually fed to the vortex created by the mixer thereby thoroughly incorporating the mixture in the bath, the operation being conducted at a temperature not exceeding 1250° F. and preferably between 1000° F. and 1100° F.

The amounts and proportions of caustic soda, coke and lead used depend, of course, upon the quantity of slimes treated and, also, upon their analyses. Thus, sufficient lead is used to insure a thoroughly liquid charge and adequately serve its function as a collector of the precious metals; coke is used in amount sufficient to insure complete reduction of the lead content of the slimes to the elemental form; and enough caustic soda is used to maintain a thoroughly molten slag at the temperature employed and to insure the conversion of the selenium and tellurium to alkali compounds thereof in reduced, water-soluble form. Experience has shown that, as a general rule, and based on the weight of the slimes to be treated, from 1% to 2% coke, 35% to 45% caustic soda, and 40% to 50% lead are adequate for the proper performance of the process.

It has been found in making the kettle fusion that the efficiency of the operation may be enhanced by introducing dry steam into the molten slag layer, the steam apparently serving to regenerate the caustic alkali as it has been found that the amount of caustic soda required when steam is used is about 5% less than that required when the steam treatment is omitted.

It is to be mentioned with respect to the amount of caustic soda used that, while same must be sufficient to convert all the selenium and tellurium to their respective alkali compounds, any great excess is to be avoided for economic reasons and to assure a low lead content in the slag. Hence, from the standpoint of conserving caustic, the optional steam treatment is advantageous. Common salt may be added to the caustic soda to lower the melting point of the slag. Also, the caustic may be in part replaced by other suitable alkali compounds e. g. soda ash, so long as the quantities used are compatible with proper fluidity of the slag at the temperature of operation.

When the last of the slimes have been thoroughly incorporated in the charge, the mixing is discontinued and the charge allowed to settle for a short period so that any metallic lead and precious metals still in the fluid slag may pass therefrom into the bath of lead below. A separation is then effected between the two layers, the lower or lead layer which contains the precious metals being transferred to the cupel furnace. Following cupellation the doré is sent to the parting plant and a part of the litharge reduced to metallic lead and returned to the process for treating additional slimes in a subsequent kettle charge.

The kettle slag which contains such of the slimes constituents as arsenic, antimony and tin in addition to the selenium and tellurium, is granulated by adding it to water, sulphur being added during the granulation if desired or necessary as hereinafter explained.

Granulation is immediately followed by agitation, filtering and washing, the filtrate containing substantially all of the selenium and tellurium as well as the bulk of the arsenic and tin with the press cake containing the precious metals, the bulk of the antimony and very little selenium or tellurium.

The filtrate is acidified with sulphuric acid and filtered yielding an arsenic-bearing filtrate which is free from selenium and tellurium and is discarded. The precipitate of selenium, tellurium and tin is sent to the selenium plant for recovery of those values.

The press cake is subjected to an oxidizing roast, leached and filtered, the filtrate being evaporated to recover the selenium and tellurium crystals which are sent to the sellenium plant. The residue from the leach contains the gold, silver and antimony and may be suitably charged to a lead softener or other smelting furnace.

An important and interesting feature of this process is the role played by sulphide sulphur in effecting solution of the tellurium with the selenium when the kettle slag is granulated in water. Usually the slimes being treated contain substantial amounts of lead sulphate which is reduced to metallic lead during the fusion, the sulphate radical reacting to yield sulphide sulphur in the melt and is available to exert its beneficial action.

The exact mechanism of this reduction is unknown and may occur along one or more different lines. Thus, the coke may reduce the lead sulphate to lead sulphide, the latter reacting with the alkali to yield sodium sulphide which in turn reacts upon the selenium and tellurium contents of the slimes. Or, the sulphide sulphur may be produced as the result of several reactions which may be visualized in part as the reduction of such compounds as sodium sulphate, sodium plumbite and sodium plumbate, resulting from the reaction of lead sulphate with caustic, to yield sodium sulphide.

In any event, it has been definitely established that if the original slimes are low in lead sulphate, it is necessary to add sulphur, either as such or as a suitable sulphur-yielding compound such as sodium sulphide or lead sulphate (with additional reducing agent, if necessary), to the kettle slag before granulation if one is to throw the bulk of the tellurium with the selenium in the filtrate following granulation of the kettle slag. This strongly indicates the presence of the tellurium as more or less complex sulpho-tellurides.

In addition to rendering substantially all the tellurium soluble, the presence of the sulphide sulphur assures complete recovery of the selenium since any selenium present in soluble selenites that escaped reduction in the original kettle treatment or which may have been formed incident to granulation of the kettle slag, is readily precipitated in the presence of sulphide sulphur upon neutralization of the filtrate obtained following granulation of the alkali kettle slag.

The beneficial effects of the above-indicated desirable reactions of sulphide sulphur with respect to the tellurium and selenium are readily assured in practise simply by adding a small amount of sulphur to each kettle slag prior to granulation as a precautionary measure.

While it is preferred to have the tellurium follow the selenium as outlined above (adding sulphur or sulphides, e. g. sodium sulphide, if necessary), the kettle slag may be treated by an alternative process such as illustrated in Fig. 2 of the drawings, wherein the kettle slag is granulated and filtered to yield a filtrate containing the bulk of the selenium and a relatively small amount of tellurium and a press cake containing the bulk of the tellurium and a relatively small amount of selenium.

In such case the filtrate may be treated as previously described while the precipitate may be roasted to volatilize selenium oxide and the residue treated for the recovery of tin and other values. The press cake may be subjected to an oxidizing roast, leached and filtered, the residue smelted for the recovery of gold, silver and antimony and the filtrate neutralized to precipitate the tellurium leaving the selenium in solution and from which it is recovered.

The alternative process just described for treating the kettle slag is well adapted for use when the raw slimes are substantially deficient in lead sulphate or are subjected, after decopperizing, to a soda ash leach as indicated in Fig. 2 whereby the lead sulphate is converted to carbonate which when reduced by coke or other suitable reducing agent in the presence of caustic soda yields lead and soda ash, the latter being thus available for reaction with the selenium and tellurium of the slime and thus effect a saving of caustic. In such cases, the fusions will lack the requisite sulphur to maintain the tellurium in the kettle slag in solution upon granulation, so that the operator has the choice of either adding sulphur to the kettle slag before or at the time of granulation, or of following the alternative procedure above outlined.

The following specific example will serve to illustrate the efficiency of the invention in effecting a separation between the selenium and precious metal contents of typical slimes: a fusion was made of 12 parts lead, 15 parts caustic, approximately one-half part coke and 27 parts leached slimes assaying 17.5% water, 3.46% selenium, 1.48% tellurium, 9.28% lead, 155.2 oz./T gold, 12,632 oz./T silver, 5.92% antimony, 2.26% arsenic, 0.65% tin and other minor impurities.

The operation was conducted in an ordinary cast iron kettle at a temperature of approximately 1100° F., the coke being added to the other kettle ingredients in three portions over a mixing period of about one hour. Dry steam was introduced with each coke addition and the slag remained fully liquid throughout the operation.

A separation was then effected between the two layers and each assayed. The slag layer showed 4.7% selenium, 1.18% tellurium, 0.5% lead, 0.35 oz./T gold and 128.6 oz./T silver. The metal layer, which was 25.5 parts by weight, showed only a trace of selenium, a bit more tellurium, 158 oz./T gold and 12,747.9 oz./T silver. The respective layers were then separately treated for recovery of their respective values as hereinbefore outlined.

The alternative process (Fig. 2) is illustrated by the following specific example: 50 parts by weight of wet decopperized slimes containing 13.2% water were leached with an aqueous solution containing 7.5 parts by weight of soda ash. The leaching was accomplished in three hours time during which open steam jets were introduced into the leaching tank to heat and agitate the solution. The slimes were then filtered and the filtrate, which contained no values, was discarded.

The press cake from the filtration was found to analyze, on a dry basis, 5.45% selenium, 1.1% tellurium, 16.2% lead, 6.7% antimony, 170.8 oz./T gold, 15,525.2 oz./T silver, 1.02% arsenic and 0.10% sulphur. This indicated an excellent elimination of sulphur along with some arsenic by the soda ash leach inasmuch as the original decopperized slimes showed 1.78% arsenic and 3.67% sulphur on a dry basis.

Thirty parts by weight of the desulphurized press cake (9.7% moisture) were subsequently mixed with 0.7 part by weight of powdered coke and gradually charged to the vortex created by a mixer in a kettle containing a molten bath of 16 parts by weight of lead and 12 parts by weight of caustic. The time consumed in making the addition was two hours thirty-five minutes during which the temperature of the fusion was maintained between 1000° F. and 1180° F. Mixing was continued for an additional fifteen minutes after the last of the slimes had been charged following which the bath was settled for twenty minutes at 1200° F. and the slag and metal cast out.

The metal, which was 34.7 parts by weight, assayed 136.1 oz./T gold, 12,662 oz./T silver, 0.3% tellurium and 0.1% selenium whereas the slag, 17.1 parts by weight, contained 8.48% total selenium (8.19% soluble selenium), 0.98% total tellurium (a trace soluble), and only 0.9% lead.

In making the fusion according to the invention the operator has a wide choice as to the particular procedure followed in adding the coke. Thus, it may be mixed with the slimes prior to charging the latter, or a portion of it may be so mixed and the remainder added after the slimes have been charged, or the slimes may be charged first and all of the coke added thereafter. Also, while coke is preferred as the reducing agent in the process, others may be employed. Thus, natural gas and crude heavy oils have been successfully used.

It will be understood that the term "sulphur" is used in the claims in the generic sense as embracing, in addition to elemental sulphur, sulphur which is present originally in combined form but which is rendered available as sulphur by reactions taking place in the fused slag.

It will be apparent from the foregoing descriptions that the present invention provides many advantages in slimes treatment. Thus, it provides an efficient low temperature process which avoids the volatilization losses of prior art high temperature processes and permits wide latitude in the choice of equipment for its use. Further, inasmuch as the separation of the selenium from the precious metals is based primarily upon conversion of the former to alkali compounds in reduced water-soluble form, proper control of the process is obtained much more readily in practise than is the case, for example, with previous proposals in which the efficiency of the treatment depends to a large extent on obtaining the selenium in a particular oxidized state. Also, a substantially complete and clean separation of the precious metal and lead contents of the slimes from the selenium and tellurium contents thereof is readily obtained with a minimum consumption of alkali reagent and, in addition, practically all of the selenium and tellurium in the slag can be readily separated in aqueous solution from the other slag values by the presence of an adequate amount of sulphide sulphur therein.

What is claimed is:

1. The process for treating slimes which comprises removing copper therefrom, fusing the decopperized slimes with a slag comprising caustic soda in the presence of a reducing agent and over a bath comprising lead to form a two-layer charge consisting of a liquid slag layer and a liquid metal layer, and separately treating said layers for the recovery of their respective values.

2. The process according to claim 1 characterized in that the fusion is accompanied by the addition of dry steam.

3. The process for treating slimes which comprises leaching copper therefrom, converting the selenium and lead contents of the slimes to highly reduced alkali compounds and metallic lead, respectively, over a lead bath whereby precious metals and the reduced lead separate from the selenium compounds and enter the lead bath, recovering precious metals from said bath, placing said reduced alkali compounds in solution, and recovering selenium from the solution.

4. The process for treating leached slimes in an iron vessel which consists in establishing a molten charge comprising lead and caustic soda in said vessel, incorporating the slimes in said charge in the presence of a carbonaceous reducing agent while maintaining the operating temperature below 1250° F., settling the charge, separating the slag layer of the settled charge from the underlying lead layer, recovering precious metal values from the latter layer, granulating the slag layer to obtain a liquor containing the bulk of the selenium and a residue containing any precious metals present in the granulated slag, and treating said liquor for the recovery of selenium.

5. The process according to claim 4 characterized in that the granulation is effected in the presence of added sulphur to insure the bulk of the tellurium entering the selenium liquor.

6. In a process for treating slimes containing selenium, tellurium and precious metals wherein the selenium and tellurium are converted to highly reduced alkali compounds and in such form separated from the precious metal constituents of the slimes; the improvement which comprises granulating the said alkali compounds in water in the presence of sulphur thereby concentrating the selenium and tellurium in the liquor, filtering the liquor immediately after granulation, acidifying the filtrate to precipitate selenium and tellurium, and recovering selenium from the precipitate.

7. In a process for treating material containing lead, precious metals and selenium by converting the selenium to soluble alkali form, the operation being conducted over a lead bath serving as a collector for the precious metals, the improvement which consists in adding sufficient coke to the charge to reduce lead compounds to metallic lead and assure the presence of the selenium in alkali form in its highest state of reduction.

8. In a process for treating slimes wherein the selenium and tellurium are converted to highly reduced alkali compounds and in such form separated from the precious metal constituents of the slimes, the steps of granulating said compounds in water, filtering, treating the filtrate to recover selenium, roasting and leaching the filter cake, recovering tellurium from the leach solution, and smelting the residue for recovery of precious metals.

9. In treating leached slimes with molten caustic alkali over a metal bath serving as a collector for the precious metals of the slimes, the improvements which consist in conducting the operation at a temperature not greatly exceeding 1200° F. and in the presence of sufficient reducing agent to convert the selenium and tellurium to highly reduced alkali compounds and convert lead compounds in the slimes to metallic lead.

10. The process for treating slimes containing precious metals, selenium and tellurium, which comprises removing copper therefrom, fusing the resulting decopperized slimes with a slag comprising caustic alkali in the presence of a reducing agent and over a molten bath comprising lead to form a charge consisting of a liquid slag layer overlying a liquid metal layer, and adding sulphur to the slag thereby concentrating the selenium and tellurium in the slag layer as soluble selenides and tellurides while simultaneously effecting a concentration of precious metals in the metal layer.

11. The process for treating slimes containing selenium and tellurium which comprises reacting the slimes in substantialy decopperized condition with a molten caustic alkali slag over a layer of molten lead, the reaction being conducted in the presence of sufficient reducing agent to maintain substantially all of the selenium and tellurium as selenides and tellurides and thereby effect a concentration of selenium and tellurium in the slag, separating the slag from the lead layer and treating the slag to separate and concentrate the selenium from the said slag while leaving tellurium concentrated in the residual slag, and recovering the said selenium and the said tellurium.

12. In the treatment of leached slimes, the improvement which consists in reacting the slimes at temperatures not substantially in excess of 1200° F. with an alkali slag, added sulphur and sufficient carbonaceous reducing agent to maintain the oxidizable slimes constituents substantially entirely in reduced condition, the said slag floating on a molten metal bath comprising lead and serving as a collector of precious metals from the slimes.

13. The process for treating slimes containing precious metals, selenium, tellurium, antimony, tin and lead which comprises treating the slimes to substantially decopperize the same, leaching the resulting decopperized slimes with a soda-ash solution thereby converting the lead content of the slimes to lead carbonate, separating the residue resulting from said leach and fusing it with caustic soda and reducing agent over a molten metal bath comprising lead at an operating temperature below 1250° F. thereby forming a two-layer charge of which the caustic soda fusion forms the top layer and the metal bath the bottom layer, causing the precious metals and lead reduced from the said lead carbonate to enter the metal layer, effecting a separation of the slag from the enriched metal layer, granulating the slag in water to obtain a solution containing substantially all of the selenium and tin, and a residue containing substantially all of the tellurium and antimony together with any precious metals that may have been retained by the slag, and treating the said residue, solution and metal bath for the recovery of their respective values.

14. The process for treating slimes containing both selenium and tellurium which comprises subjecting the slimes, after decopperization, to an alkali leach, fusing the leach residue with alkali compounds in the presence of reducing agent over a molten bath comprising lead to form a two-layer charge, effecting a separation between the two layers, and granulating the upper slag layer in the presence of sufficient sulphide sulphur to assure the bulk of tellurium entering the solution with the selenium.

JESSE O. BETTERTON.
YURII E. LEBEDEFF.
DONALD P. WILKES.